United States Patent
Lee et al.

(10) Patent No.: US 11,095,323 B2
(45) Date of Patent: Aug. 17, 2021

(54) METHOD FOR GATEWAY SIGNALING FOR MISO OPERATION AND APPARATUS THEREFOR

(71) Applicant: ELECTRONICS AND TELECOMMUNICATIONS RESEARCH INSTITUTE, Daejeon (KR)

(72) Inventors: Jae-Young Lee, Daejeon (KR); Sung-Ik Park, Daejeon (KR); Sun-Hyoung Kwon, Daejeon (KR); Heung-Mook Kim, Daejeon (KR); Nam-Ho Hur, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/615,940

(22) PCT Filed: May 23, 2018

(86) PCT No.: PCT/KR2018/005822
§ 371 (c)(1),
(2) Date: Nov. 22, 2019

(87) PCT Pub. No.: WO2018/216999
PCT Pub. Date: Nov. 29, 2018

(65) Prior Publication Data
US 2020/0195285 A1 Jun. 18, 2020

(30) Foreign Application Priority Data

| May 24, 2017 | (KR) | ........................ 10-2017-0063956 |
| May 25, 2017 | (KR) | ........................ 10-2017-0064731 |
| May 21, 2018 | (KR) | ........................ 10-2017-0057770 |

(51) Int. Cl.
*H04B 1/04* (2006.01)
*H04L 12/18* (2006.01)
*H04L 12/66* (2006.01)

(52) U.S. Cl.
CPC .......... *H04B 1/0475* (2013.01); *H04L 12/18* (2013.01); *H04L 12/66* (2013.01)

(58) Field of Classification Search
CPC ......... H04B 1/0475; H04B 1/62; H04L 12/18; H04L 12/66; H04L 1/1678; H04L 27/367;
(Continued)

(56) References Cited

U.S. PATENT DOCUMENTS

| 7,206,364 B2 * | 4/2007 | Miller ...................... H04B 7/04 370/335 |
| 7,944,809 B2 * | 5/2011 | Kim .................... H04B 7/15557 370/208 |

(Continued)

FOREIGN PATENT DOCUMENTS

| KR | 10-2011-0133311 A | 12/2011 |
| KR | 10-2017-0009737 A | 1/2017 |

OTHER PUBLICATIONS

LoPresto, Scott et al., "Transmit Diversity Code Filter Sets (TDCFSs), an MISO Antenna Frequency Predistortion Scheme for ATSC 3.0," *IEEE Transactions on Broadcasting*, vol. 62, Issue: 1, Mar. 2016, (pp. 271-280).

(Continued)

*Primary Examiner* — James M Perez
(74) *Attorney, Agent, or Firm* — NSIP Law

(57) ABSTRACT

Disclosed herein are a gateway-signaling method for Multiple-Input Single-Output (MISO) operation and an apparatus for the same. An apparatus for transmitting a broadcast signal according to an embodiment of the present invention includes a predistortion unit for performing predistortion for (Continued)

decorrelating signals corresponding to transmitters using the number of transmitters used for MISO and a transmitter coefficient index that are identified using a timing and management packet transmitted through a Studio-to-Transmitter Link (STL), thereby generating a pre-distorted signal; and an RF signal generation unit for generating an RF transmission signal using the pre-distorted signal corresponding to the transmitter coefficient index.

18 Claims, 6 Drawing Sheets

(58) Field of Classification Search
CPC ....... H04L 27/368; H04L 25/49; H04L 47/78; H04L 47/781; H04L 47/782
See application file for complete search history.

(56) References Cited

U.S. PATENT DOCUMENTS

| | | | | |
|---|---|---|---|---|
| 7,944,993 | B2* | 5/2011 | Dankberg | H04B 7/18517 375/299 |
| 8,194,772 | B2* | 6/2012 | Choi | H04L 1/06 375/267 |
| 8,948,293 | B2* | 2/2015 | Onggosanusi | H04B 7/0469 375/284 |
| 9,154,352 | B2* | 10/2015 | Palanki | H04L 27/2601 |
| 9,713,019 | B2* | 7/2017 | Negus | H04W 24/02 |
| 9,991,972 | B1* | 6/2018 | Dogan | H04L 25/0248 |
| 10,187,126 | B2* | 1/2019 | Saha | H04B 7/0413 |
| 10,225,040 | B2* | 3/2019 | Park | H04W 52/04 |
| 10,454,536 | B2* | 10/2019 | Park | H04L 25/0224 |
| 10,505,593 | B2* | 12/2019 | Okuyama | H04B 7/0632 |
| 10,673,549 | B1* | 6/2020 | Smalley | H04L 65/4076 |
| 10,708,106 | B2* | 7/2020 | Kim | H04L 27/266 |
| 10,873,343 | B2* | 12/2020 | Myung | H03M 13/1157 |
| 10,873,350 | B2* | 12/2020 | Oh | H04N 21/4382 |
| 2002/0027957 | A1* | 3/2002 | Paulraj | H04L 1/06 375/267 |
| 2004/0041948 | A1* | 3/2004 | Collins | H04N 7/0806 348/555 |
| 2006/0270341 | A1* | 11/2006 | Kim | H04B 7/2606 455/16 |
| 2008/0080436 | A1* | 4/2008 | Sandhu | H04W 52/241 370/338 |
| 2008/0274692 | A1* | 11/2008 | Larsson | H04L 5/0035 455/24 |
| 2008/0304555 | A1* | 12/2008 | Larsson | H04B 7/022 375/211 |
| 2009/0143008 | A1* | 6/2009 | Hottinen | H04B 7/0619 455/11.1 |
| 2010/0008287 | A1* | 1/2010 | Lin | H04L 5/0037 370/315 |
| 2010/0061293 | A1* | 3/2010 | Schiff | H04B 7/18534 370/316 |
| 2010/0150013 | A1* | 6/2010 | Hara | H04B 17/12 370/252 |
| 2010/0272005 | A1* | 10/2010 | Larsson | H04B 7/15564 370/315 |
| 2011/0199919 | A1* | 8/2011 | Lin | H04B 17/382 370/252 |
| 2011/0249708 | A1* | 10/2011 | Maca | H04B 7/15564 375/213 |
| 2011/0267991 | A1* | 11/2011 | Damnjanovic | H04L 1/1607 370/279 |
| 2011/0268064 | A1* | 11/2011 | Chen | H04L 5/0094 370/329 |
| 2011/0274031 | A1* | 11/2011 | Gaal | H04L 5/0051 370/315 |
| 2012/0063383 | A1* | 3/2012 | Barbieri | H04W 72/082 370/315 |
| 2013/0077504 | A1* | 3/2013 | Parikh | H04H 60/11 370/252 |
| 2013/0201912 | A1* | 8/2013 | Sheng | H04B 7/0634 370/328 |
| 2014/0140319 | A1* | 5/2014 | Doetsch | H04B 7/024 370/330 |
| 2015/0215193 | A1* | 7/2015 | Kim | H04L 65/80 370/252 |
| 2015/0341053 | A1* | 11/2015 | Kim | H03M 13/2707 714/776 |
| 2016/0182171 | A1* | 6/2016 | Milbar | H04H 20/72 375/259 |
| 2016/0182192 | A1* | 6/2016 | Milbar | H04L 1/16 714/748 |
| 2016/0302093 | A1* | 10/2016 | Fuller | H04H 20/12 |
| 2016/0344499 | A1* | 11/2016 | Myung | H03M 13/255 |
| 2017/0005761 | A1* | 1/2017 | Oh | H04L 27/2613 |
| 2017/0019207 | A1* | 1/2017 | Park | H04J 11/004 |
| 2017/0223653 | A1* | 8/2017 | Weitnauer | H04B 7/024 |
| 2017/0290057 | A1* | 10/2017 | Fang | H04B 7/15542 |
| 2017/0346525 | A1* | 11/2017 | Stirling-Gallacher | H04B 7/0695 |
| 2018/0020264 | A1* | 1/2018 | Earnshaw | H04L 1/0041 |
| 2018/0254855 | A1* | 9/2018 | Shin | H04L 12/18 |
| 2018/0351609 | A1* | 12/2018 | Park | H04L 25/03891 |
| 2019/0199460 | A1* | 6/2019 | Simon | H04H 20/67 |
| 2019/0222375 | A1* | 7/2019 | Wu | H04L 1/007 |
| 2019/0305886 | A1* | 10/2019 | Baek | H04L 1/0071 |
| 2019/0313137 | A1* | 10/2019 | Bui Do | H04L 65/1069 |
| 2019/0387035 | A1* | 12/2019 | Lee | H04L 69/169 |
| 2020/0022100 | A1* | 1/2020 | Simon | H04W 56/0015 |
| 2020/0128511 | A1* | 4/2020 | Lee | H04W 72/005 |
| 2020/0136877 | A1* | 4/2020 | Kim | H04B 7/0413 |
| 2020/0146019 | A1* | 5/2020 | Lee | H04W 72/082 |
| 2020/0195285 | A1* | 6/2020 | Lee | H04B 1/0475 |

OTHER PUBLICATIONS

"Transmission and Reception for Terrestrial UHDTV Broadcasting Service," *Telecommunications Technology Association*, TTAK.KO-07.0127 /R1, TTA Standard, Dec. 2016. (pp. 1-844).
Songho Jeon, "ATSC 3.0 based terrestrial UHD standard and SFN implenetation plan," *KBS Institute of Future Technology*, KOBA 2017 International broadcasting conference, UHD session @ COEX seminar room 307, May 16, 2017 (3 pages in English and 2 pages in Korean).
International Search Report dated Aug. 29, 2018 in counterpart International Patent Application No. PCT/KR2018/005822 (2 pages in English and 2 pages in Korean).

* cited by examiner

METHOD FOR GATEWAY SIGNALING FOR MISO OPERATION AND APPARATUS THEREFOR

CROSS REFERENCE TO RELATED APPLICATIONS

This application is a U.S. National Stage Application of International Application No. PCT/KR2018/005822, filed on May 23, 2018, which claims the benefit under 35 USC 119(a) and 365(b) of Korean Patent Application No. 10-2017-0063956, filed on May 24, 2017, Korean Patent Application No. 10-2017-0064731, filed on May 25, 2017, and Korean Patent Application No. 10-2018-0057770, filed on May 21, 2018, in the Korean Intellectual Property Office the entire disclosure of which is incorporated herein by reference for all purposes.

TECHNICAL FIELD

The present invention relates generally to technology for transmitting broadcast signals, and more particularly to a broadcast signal transmission system to which Multiple-Input Single-Output (MISO) is applied.

BACKGROUND ART

In terrestrial broadcasting, a Single-Frequency Network (SFN) has emerged as an alternative to conventional Multiple-Frequency Network (MFN) modes. An SFN is configured such that multiple transmitters simultaneously transmit signals on the same RF channel.

An SFN provides extended-coverage spectral efficiency as well as homogeneous distribution of received signal strengths over a coverage area. However, some SFN areas may suffer signal degradation. The amplitudes of Digital Terrestrial Television (DTT) echoes, which have similar signal magnitude but different phases when reaching a receiver, cause serious multi-path conditions that generate destructive interference.

In order to prevent such an unwanted situation, new features, such as Multiple-Input Single-Output (MISO) and the like, are being applied to the new generation of DTT.

'MISO' refers to a radio link that uses at least two transmitters and a single receiver. Conventional topology configured with a single transmitter and a single receiver is referred to as 'SISO'. MISO improves the robustness of terrestrial transmission using the spatial diversity of multiple antennas.

When transmitters configuring an SFN transmit broadcast signals using a MISO method, it is required to signal parameters for MISO. When these parameters are not correctly signaled, MISO service using multiple transmitters may not be successfully performed.

DISCLOSURE

Technical Problem

An object of the present invention is to provide efficient MISO service by properly signaling information that is necessary for the MISO operation of multiple transmitters that configure an SFN.

Another object of the present invention is to efficiently provide MISO broadcast service by signaling information that is necessary for MISO using the optimum number of bits through a Transmit Diversity Code Filter Set (TDCFS) method.

Technical Solution

In order to accomplish the above objects, an apparatus for transmitting a broadcast signal according to the present invention includes a predistortion unit for performing predistortion for decorrelating signals corresponding to transmitters using the number of transmitters used for Multiple-Input Single-Output (MISO) and a transmitter coefficient index, which are identified using a timing and management packet transmitted through a Studio-to-Transmitter Link (STL), and thereby generating a pre-distorted signal; and an RF signal generation unit for generating an RF transmission signal using the pre-distorted signal corresponding to the transmitter coefficient index.

Here, MISO may be performed using Transmit Diversity Code Filter Set (TDCFS).

Here, the apparatus may further include a structure data extractor for extracting structure data, which is transmitted from a broadcast gateway device and includes first data fields for all of the transmitters; and a per-transmitter data extractor for extracting per-transmitter data, which is transmitted from the broadcast gateway device and includes second data fields for one transmitter of the transmitters.

Here, the structure data extractor may extract a first MISO field, which represents the number of transmitters used for the MISO, from among the first data fields, and the per-transmitter data extractor may extract a second MISO field, which represents the transmitter coefficient index, from among the second data fields.

Here, the first MISO field may be a 2-bit field, and may indicate the number of different MISO filter codes in use within a Single-Frequency Network (SFN).

Here, the second MISO field may be a 2-bit field, and may indicate a specific MISO filter code assigned to the one transmitter.

Here, the second MISO field may be set to a value that is equal to or less than the value of the first MISO field.

Also, a broadcast gateway device according to an embodiment of the present invention includes a packet generation unit for generating a timing and management packet for signaling the number of transmitters used for Multiple-Input Single-Output (MISO) and a transmitter coefficient index to one transmitter of the transmitters; and an STL transmission unit for transmitting the timing and management packet to the transmitters through a Studio-to-Transmitter Link (STL).

Here, the MISO may be performed through predistortion processing using Transmit Diversity Code Filter Set (TDCFS).

Here, the broadcast gateway device may further include a structure data generation unit for generating structure data, which includes first data fields for all of the transmitters; and a per-transmitter data generation unit for generating per-transmitter data, which includes second data fields for the one transmitter.

Here, the structure data generation unit may generate a first MISO field, which represents the number of transmitters used for the MISO, as one of the first data fields, and the per-transmitter data generation unit may generate a second MISO field, which represents the transmitter coefficient index of the one transmitter, as one of the second data fields.

Here, the timing and management packet may include the structure data and the per-transmitter data.

Here, the first MISO field may be a 2-bit field, and may be set based on the number of different MISO filter codes in use within a Single-Frequency Network (SFN).

Here, the second MISO field may be a 2-bit field, and may indicate a specific MISO filter code assigned to the one transmitter.

Here, the second MISO field may be set to a value that is equal to or less than the value of the first MISO field.

Here, the MISO filter codes may correspond to 64 coefficients or 256 coefficients.

Also, a gateway-signaling method according to an embodiment of the present invention includes generating structure data, which includes first data fields for all of transmitters used for Multiple-Input Single-Output (MISO); generating per-transmitter data, which includes second data fields only for one transmitter of the transmitters; generating a timing and management packet, which includes the structure data and the per-transmitter data; and transmitting the timing and management packet to the transmitters through a Studio-to-Transmitter Link (STL).

Here, MISO may be performed through predistortion processing using Transmit Diversity Code Filter Set (TDCFS).

Here, the first data fields may include a first MISO field, which represents the number of transmitters used for the MISO, and the second data fields may include a second MISO field, which represents a transmitter coefficient index of the one transmitter.

Here, the second MISO field may be set to a value that is equal to or less than the value of the first MISO field.

Advantageous Effects

According to the present invention, information that is necessary for the MISO operation of multiple transmitters that configure an SFN is correctly signaled, whereby efficient MISO service may be provided.

Also, according to the present invention, information that is necessary for MISO is signaled using the optimum number of bits through a Transmit Diversity Code Filter Set (TDCFS) method, whereby MISO broadcast service may be efficiently provided.

BEST MODE

Figure 1:
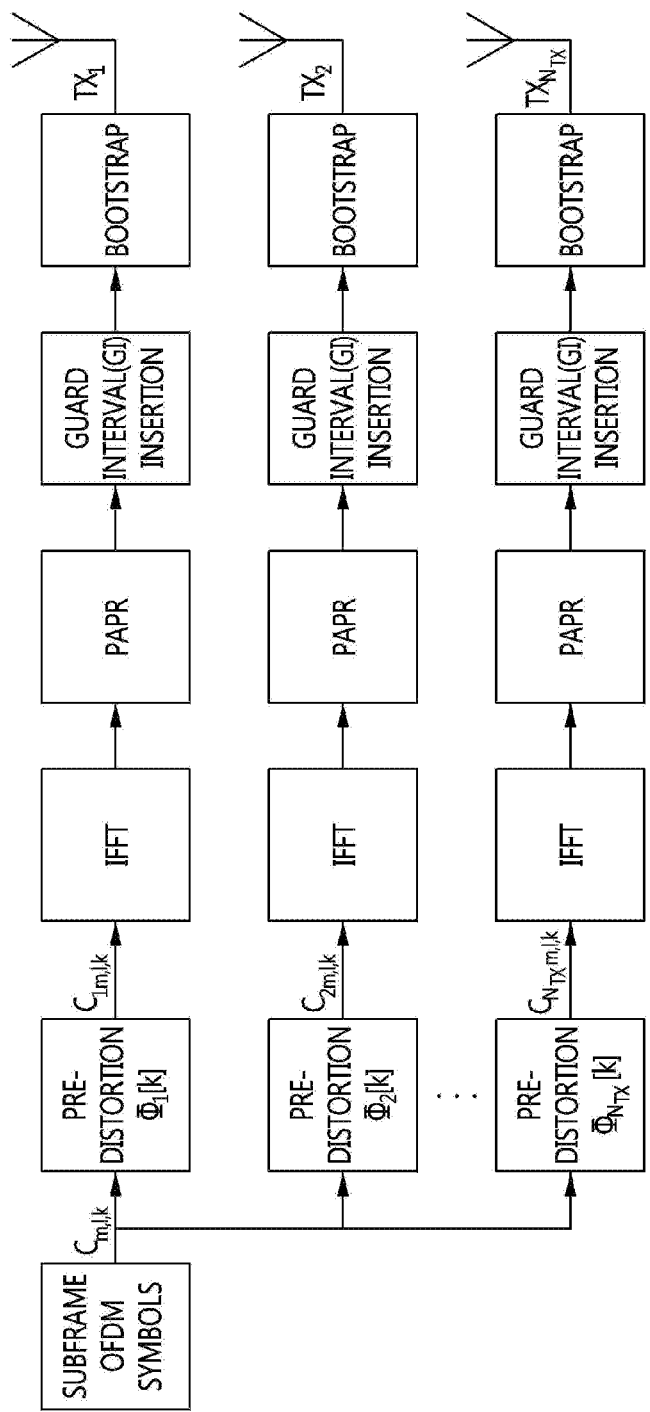
FIG. 1 is a block diagram that shows a multi-transmitter system according to an embodiment of the present invention.

The present invention will be described in detail below with reference to the accompanying drawings. Repeated descriptions, as well as descriptions of known functions and configurations which have been deemed to unnecessarily obscure the gist of the present invention, will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

A MISO scheme may be divided into two schemes, which are phase/frequency predistortion and Space-Time Block Coding (STBC).

Phase/frequency predistortion decorrelates signals from different transmitters using a specific linear phase distortion algorithm. Such decorrelation reduces frequency-selective fading. As methods for this, there is an enhanced Single-Frequency Network (eSFN) approach.

Signals at the center of an SFN may cancel each other at a receiver. In order to avoid this disadvantageous effect, a linear phase predistortion algorithm may be used at a transmitter. This predistortion has to be unique for each transmitter and has to be different across OFDM subcarriers. Therefore, a transmitted signal may be represented as shown in the following Equation 1.

$$T_x(i) = S(i) \cdot C_x(i) \qquad \text{[Equation 1]}$$

where i denotes an index indicating an OFDM subcarrier, $S(i)$ denotes a non-distorted complex symbol, $C_x(i)$ is the complex predistortion function of a transmitter x corresponding to the subcarrier i, and $T_x(i)$ is a transmitted complex symbol for the transmitter x.

As one of phase/frequency predistortion schemes, there is a Transmit Diversity Code Filter Set (TDCFS) method. TDCFS may provide high signal-decorrelation performance in the frequency domain.

In order to reduce potential destructive interference, TDCFS may decorrelate signals from transmitters in a Single-Frequency Network (SFN).

TDCFS uses linear frequency domain filters, so compensation at a receiver may be implemented in an equalization process. The linear frequency domain filters may be all-pass filters with minimized cross-correlation under the constraints of the number of transmitters (a maximum of four transmitters) ($N_{TX} \in \{2, 3, 4\}$) and the time domain span of the filters (a filter length of 64 or 256) ($N_{MISO} \in \{64, 256\}$).

MISO should be applied only to the OFDM symbols of a subframe, and should not be applied to a bootstrap or a preamble. The use of MISO may be signaled using MISO signaling fields, and the MISO signaling fields may indicate any one of a mode in which MISO is not used, a MISO mode using 64 coefficients, and a MISO mode using 256 coefficients. For example, the MISO signaling fields may include a 2-bit field.

FIG. 1 is a block diagram that shows a multi-transmitter system according to an embodiment of the present invention.

Referring to FIG. 1, $N_{TX}$ predistortion filters are applied to the OFDM symbols of each subframe in the frequency domain.

A code filter frequency domain predistortion function $\Phi_x[k]$ may correspond to time-domain impulse response vectors. Here, the time-domain impulse response vectors may include the number of complex numbers corresponding to the filter length. For example, when the filter length is 64, the time-domain impulse response vectors may include 64 complex numbers, and when the filter length is 256, the time-domain impulse response vectors may include 256 complex numbers.

Here, the time-domain impulse response vectors may be determined depending on the number of antennas ($N_{TX} \in \{2, 3, 4\}$) and on a transmitter index ($h_x$). Here, $x \in \{1, \ldots, N_{TX}\}$. That is, the number of complex numbers corresponding to the filter length, which corresponds in turn to the number of antennas and a transmitter index, may be determined when the number of antennas and the transmitter index are determined.

For example, when the number of antennas is 2 and when a MISO mode using 64 coefficients is used, 64 complex numbers corresponding to a transmitter index $h_1$ and 64 complex numbers corresponding to a transmitter index $h_2$ are stored in a table, and complex numbers corresponding to a relevant transmitter may be read from the table when MISO is performed.

For example, when the number of antennas is 3 and when the MISO mode using 64 coefficients is used, 64 complex numbers corresponding to a transmitter index $h_1$, 64 complex numbers corresponding to a transmitter index $h_2$, and 64 complex numbers corresponding to a transmitter index $h_3$ are stored in a table, and complex numbers corresponding to a relevant transmitter may be read from the table when MISO is performed.

For example, when the number of antennas is 4 and when the MISO mode using 64 coefficients is used, 64 complex numbers corresponding to a transmitter index $h_1$, 64 complex numbers corresponding to a transmitter index $h_2$, 64 complex numbers corresponding to a transmitter index $h_3$, and 64 complex numbers corresponding to a transmitter index $h_4$ are stored in a table, and complex numbers corresponding to a relevant transmitter may be read from the table when MISO is performed.

For example, when the number of antennas is 2 and when a MISO mode using 256 coefficients is used, 256 complex numbers corresponding to a transmitter index $h_1$ and 256 complex numbers corresponding to a transmitter index $h_2$ are stored in a table, and complex numbers corresponding to a relevant transmitter may be read from the table when MISO is performed.

For example, when the number of antennas is 3 and when the MISO mode using 256 coefficients is used, 256 complex numbers corresponding to a transmitter index $h_1$, 256 complex numbers corresponding to a transmitter index $h_2$, and 256 complex numbers corresponding to a transmitter index $h_3$ are stored in a table, and complex numbers corresponding to a relevant transmitter may be read from the table when MISO is performed.

For example, when the number of antennas is 4 and when the MISO mode using 256 coefficients is used, 256 complex numbers corresponding to a transmitter index $h_1$, 256 complex numbers corresponding to a transmitter index $h_2$, 256 complex numbers corresponding to a transmitter index $h_3$, and 256 complex numbers corresponding to a transmitter index $h_4$ are stored in a table, and complex numbers corresponding to a relevant transmitter may be read from the table when MISO is performed.

The code filter frequency domain predistortion function $\Phi_x[k]$ may be represented as shown in the following Equation 2.

$$\Phi_x[k] = \exp\left[j\arg\left(\sum_{n=0}^{N_{MISO}-1} h_x[n] e^{-\frac{j2\pi k n}{N_{FFT}^m}}\right)\right]; \quad \text{[Equation 2]}$$

$$k \in \{0, \ldots, NoC-1\}, x \in \{1, \ldots, N_{TX}\}$$

where exp( ) denotes a natural exponentiation function, and arg( ) denotes an argument function that provides the angle of a complex value in units of radians.

The function $\Phi_x[k]$ may be applied as shown in the following Equation 3.

$$c_{x,m,l,k} = \Phi_x[k] c_{m,l,k}; k \in \{0, \ldots, NoC-1\}, x \in \{1, \ldots, N_{TX}\} \quad \text{[Equation 3]}$$

where NoC denotes the number of carriers, $N_{TX}$ denotes the number of transmitters, k denotes a carrier number, l denotes an OFDM symbol index that starts from 0 at the first OFDM symbol of each subframe, m denotes a subframe index, x denotes a transmitter index ($x \in \{1, \ldots, N_{TX}\}$), $c_{m,l,k}$ denotes a complex modulation value for the carrier k of the OFDM symbol, the index of which is l, in the subframe, the index of which is m, and $c_{x,m,l,k}$ denotes a post-MISO complex modulation value for the carrier k of the OFDM symbol, the index of which is l, in the subframe, the index of which is m, for the transmitter index x.

Figure 2:
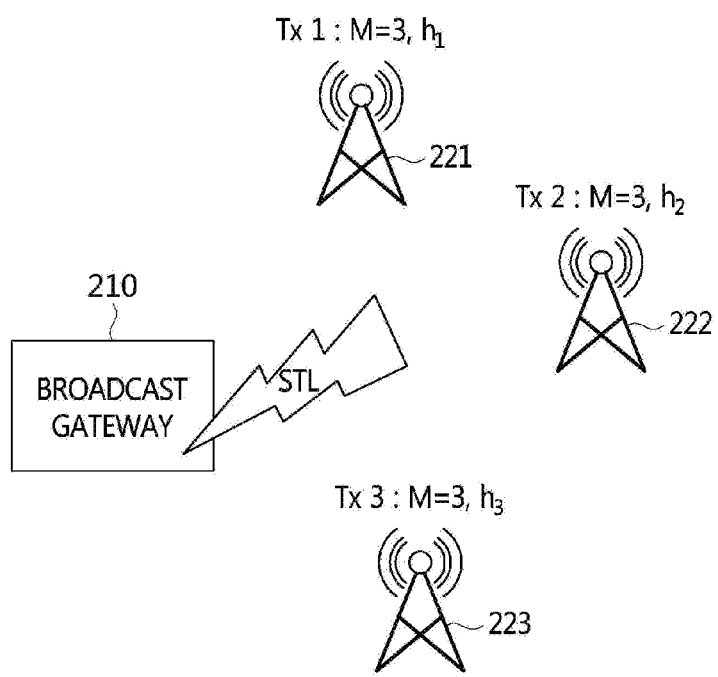
FIG. 2 is a view that shows a Single-Frequency Network (SFN) system according to an embodiment of the present invention.

FIG. 2 is a view that shows a Single-Frequency Network (SFN) system according to an embodiment of the present invention.

Referring to FIG. 2, the SFN system according to an embodiment of the present invention includes a broadcast gateway device 210 and multiple transmitters 221, 222 and 223.

In order to use MISO in a Single-Frequency Network (SFN), two MISO parameters, which are the number of transmitters, M, and a transmitter coefficient index, $h_x$, should be transmitted to the transmitters 221, 222 and 223.

That is, each of the transmitter 221, 222 and 223 may read complex numbers corresponding to filter coefficients from a table only when it knows the number of all of the transmitters used for MISO (M) and the transmitter coefficient index thereof ($h_x$). For example, the transmitter 221 may generate filter coefficients for TDCFS only when it knows that the number of all of the transmitters, M, is 3 and its transmitter coefficient index is 1 ($h_1$). In another example, the transmitter 222 may generate filter coefficients for TDCFS only when it knows that the number of all of the transmitters, M, is 3 and its transmitter coefficient index is 2 ($h_2$). In yet another example, the transmitter 223 may generate filter coefficients for TDCFS only when it knows that the number of all of the transmitters, M, is 3 and its transmitter coefficient index is 3 ($h_3$).

The MISO parameters, such as the number of all of the transmitters used for MISO (M) and a transmitter coefficient index ($h_x$), are not required to be included in a preamble, but are necessary for the design and configuration of an SFN.

Here, the MISO parameters may be transmitted to the transmitters.

The broadcast gateway device 210 transmits the MISO parameters, which are necessary for the respective transmitters, to the transmitters 221, 222 and 223 through a Studio-to-Transmitter Link (STL).

That is, the transmitters 221, 222 and 223 may be provided with the necessary MISO parameters from the broadcast gateway device 210 through the Studio-to-Transmitter Link (STL) and perform TDCFS using the provided MISO parameters.

Here, the STL may be a data transmission/reception link between the broadcast gateway device 210 and the transmitters 221, 222 and 223 in a broadcast transmission system, and may be a fiber, satellite, or microwave link. Here, the STL may be a wired or wireless link, and may be a link through which data is transmitted and received using a packet-based protocol, such as RTP, UDP, IP, or the like.

Figure 3:
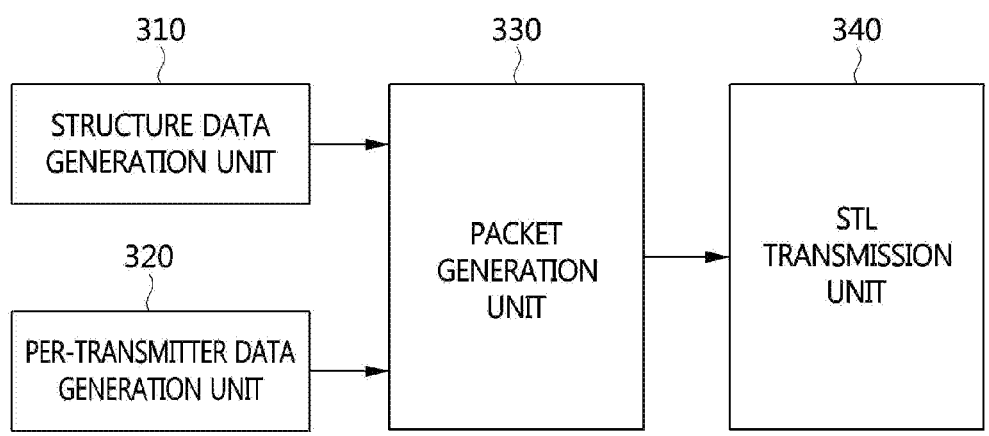
FIG. 3 is a block diagram that shows an example of the broadcast gateway device illustrated in FIG. 2.

FIG. 3 is a block diagram that shows an example of the broadcast gateway device illustrated in FIG. 2.

Referring to FIG. 3, the broadcast gateway device 210 shown in FIG. 2 includes a structure data generation unit 310, a per-transmitter data generation unit 320, a packet generation unit 330, and an STL transmission unit 340.

The structure data generation unit 310 generates structure data, which includes first data fields for all of the transmitters used for MISO. Here, the first data fields may be data fields used in common by all of the transmitters.

Here, the structure data generation unit 310 may generate a first MISO field (num_miso_filt_codes), which represents the number of transmitters used for MISO, as one of the first data fields. That is, the first data fields may include the first MISO field.

The per-transmitter data generation unit 320 generates per-transmitter data, which includes second data fields for one transmitter of the transmitters used for MISO. Here, each of the second data fields may have different values for the respective transmitters. Here, each of the second data fields may be prepared for the respective transmitters with the same field name. For example, the second data fields may be defined in a FOR loop that is iterated as many times as the number of all of the transmitters.

Here, the per-transmitter data generation unit 320 may generate a second MISO field (miso_filt_code_index), which represents the transmitter coefficient index of a corresponding transmitter, as one of the second data fields. That is, the second data fields may include the second MISO field.

The packet generation unit 330 generates a timing and management packet for signaling the number of transmitters and the transmitter coefficient index to one transmitter of the transmitters used for MISO.

Here, the timing and management packet may include structure data and per-transmitter data.

The STL transmission unit 340 transmits the timing and management packet to the transmitters through a Studio-to-Transmitter Link (STL).

Here, MISO may be performed through predistortion processing using Transmit Diversity Code Filter Set (TDCFS).

The following Table 1 shows an example of the timing and management packet.

TABLE 1

| Syntax | No. of Bits | Format |
|---|---|---|
| Timing & Management_Packet (TMP) ( ) { | | |
| Structure_Data ( ) { | | |
| length | 16 | uimsbf |
| version_major | 4 | uimsbf |
| version_minor | 4 | uimsbf |
| maj_log_rep_cnt_pre | 4 | uimsbf |
| maj_log_rep_cnt_tim | 4 | uimsbf |
| bootstrap_major | 4 | uimsbf |
| bootstrap_minor | 4 | uimsbf |
| min_time_to_next | 5 | uimsbf |
| system_bandwidth | 2 | uimsbf |
| bsr_coefficient | 7 | uimsbf |
| preamble_structure | 8 | uimsbf |
| ea_wakeup | 2 | bslbf |
| num_emission_tim | 6 | uimsbf |
| num_xmtrs_in_group | 6 | uimsbf |
| xmtr_group_num | 7 | uimsbf |
| maj_log_override | 3 | bslbf |

TABLE 1-continued

| Syntax | No. of Bits | Format |
|---|---|---|
| num_miso_filt_codes | 2 | bslbf |
| tx_carrier_offset | 2 | tcimsbf |
| reserved | 6 | for (i = 0; i < 6; i++) '1' |
| } | | |
| Bootstrap_Timing_Data ( ) { | | |
| for (i=0; i<=num_emission_tim; i++) | | |
| seconds | 32 | uimsbf |
| nanoseconds | 32 | uimsbf |
| } | | |
| } | | |
| Per_Transmitter_Data ( ) { | | |
| for (i=0; i<num_xmtrs_in_group; i++) { | | |
| xmtr_id | 13 | uimsbf |
| tx_time_offset | 16 | tcimsbf |
| txid_injection_lvl | 4 | uimsbf |
| miso_filt_code_index | 2 | bslbf |
| reserved | 29 | for (i = 0; i < 29; i++) '1' |
| } | | |
| } | | |
| Error_Check_Data ( ) { | | |
| reserved | 16 | |
| crc16 | 16 | uimsbf |
| } | | |
| } | | |

In Table 1, 'uimsbf' means unsigned integer, most significant bit first, 'bslbf' means bit stream, leftmost bit first, and 'tcimsbf' means two's complement integer, most significant bit first. In the example of Table 1, the timing and management packet may correspond to Timing & Management_Packet (TMP) ( ), the structure data may correspond to Structure_Data ( ), and per-transmitter data may correspond to Per_Transmitter_Data ( ).

Here, the first data fields may include length, version_major, version_minor, maj_log_rep_cnt_pre, maj_log_rep_cnt_tim, bootstrap_major, bootstrap_minor, min_time_to_next, system_bandwidth, bsr_coefficient, preamble_structure, ea_wakeup, num_emission_tim, num_xmtrs_in_group, xmtr_group_num, maj_log_override, num_miso_filt_codes, and tx_carrier_offset.

Here, the second data fields may include xmtr_id, tx_time_offset, txid_injection_lvl and miso_filt_code_index.

Here, the first MISO field may be num_miso_filt_codes having a length of 2 bits, and the second MISO field may be miso_filt_code_index having a length of 2 bits.

Here, because num_miso_filt_codes is defined in Structure_Data ( ), this field may be applied in common to all of the transmitters that receive Timing & Management_Packet (TMP) ( ).

Here, because miso_filt_code_index is defined in Per_Transmitter_Data ( ) and is defined in a FOR loop corresponding to all of the transmitters in a group using MISO, this field may be individually applied to the respective transmitters.

Here, num_miso_filt_codes may indicate the number of different MISO filter codes in use within an SFN, as represented by the variable "M" or "$N_{TX}$". That is, the first MISO field is a 2-bit field, and may be set based on the number of different MISO filter codes in use within an SFN.

Here, miso_filt_code_index may be a specific MISO filter code assigned to an individual transmitter, as represented by the index of 'h'. That is, the second MISO field is a 2-bit field, and may indicate the specific MISO filter code assigned to the transmitter.

Here, the same value of a MISO filter code index corresponding to miso_filt_code_index may be applied to a particular transmitter regardless of whether 64-coefficient or 256-coefficient filters are in use.

Accordingly, the second MISO field may be set to a value that is equal to or less than the value of the first MISO field.

Figure 4:
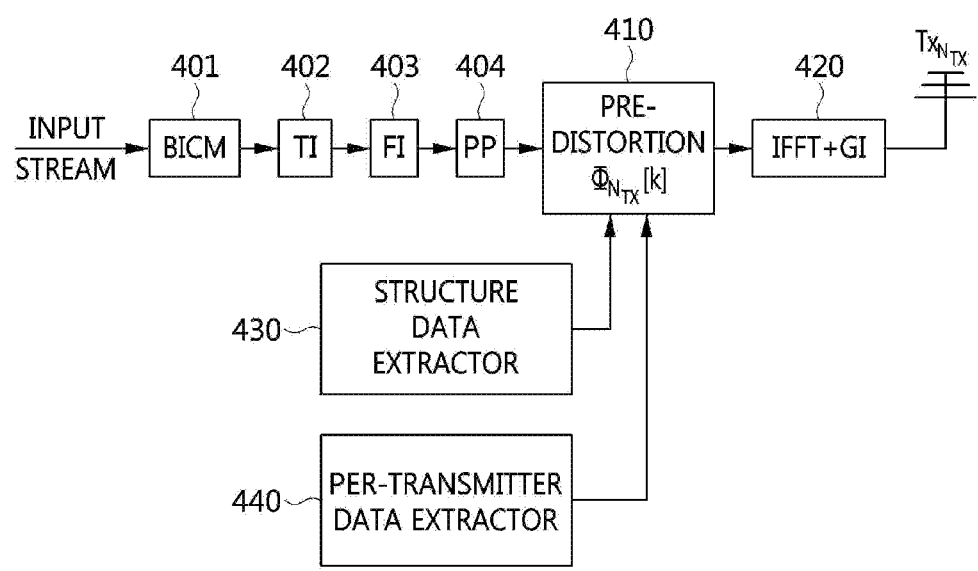
FIG. 4 is a block diagram that shows an example of the transmitter illustrated in FIG. 2.

FIG. 4 is a block diagram that shows an example of the transmitter illustrated in FIG. 2.

Referring to FIG. 4, the transmitter shown in FIG. 2 includes a BICM unit 401, a time interleaver 402, a frequency interleaver 403, a pilot pattern insertion unit 404, a predistortion unit 410, an RF signal generation unit 420, a structure data extractor 430, and a per-transmitter data extractor 440.

The BICM unit 401, to which an input stream is input, performs channel coding, bit interleaving, and modulation.

The time interleaver 402 performs time interleaving for the input signal, and the frequency interleaver 403 performs frequency interleaving.

The pilot pattern insertion unit 404 inserts a pilot pattern in the frequency-interleaved signal.

The operations of the blocks, such as the BICM unit 401, the time interleaver 402, the frequency interleaver 403, and the pilot pattern insertion unit 404, are disclosed in detail in Korean Patent Application Publication No. 10-2017-0009737.

The predistortion unit 410 generates a pre-distorted signal by performing predistortion for decorrelating signals corresponding to transmitters using the number of transmitters used for MISO and a transmitter coefficient index, which are identified using a timing and management packet transmitted through a Studio-to-Transmitter Link (STL).

Here, MISO may be performed using Transmit Diversity Code Filter Set (TDCFS).

The RF signal generation unit 420 generates an RF transmission signal using the pre-distorted signal corresponding to the transmitter coefficient index.

The RF signal generation unit 420 may be a block that includes an IFNT block, a PAPR block, a GI INSERTION block, and a BOOTSTRAP block, illustrated in FIG. 1.

The structure data extractor 430 extracts structure data, which is transmitted from the broadcast gateway device and includes first data fields for all of the transmitters.

Here, the structure data extractor 430 may extract a first MISO field, which represents the number of transmitters used for MISO, from among the first data fields.

The per-transmitter data extractor 440 extracts per-transmitter data, which is transmitted from the broadcast gateway device and includes the second data fields for one transmitter of the transmitters.

Here, the per-transmitter data extractor 440 may extract a second MISO field, which represents the transmitter coefficient index, from among the second data fields.

Here, the first MISO field is a 2-bit field, and may indicate the number of different MISO filter codes in use within an SFN.

Here, the second MISO field is a 2-bit field, and may indicate a specific MISO filter code assigned to the transmitter.

Here, the second MISO field may be set to a value that is equal to or less than the value of the first MISO field.

Figure 5:
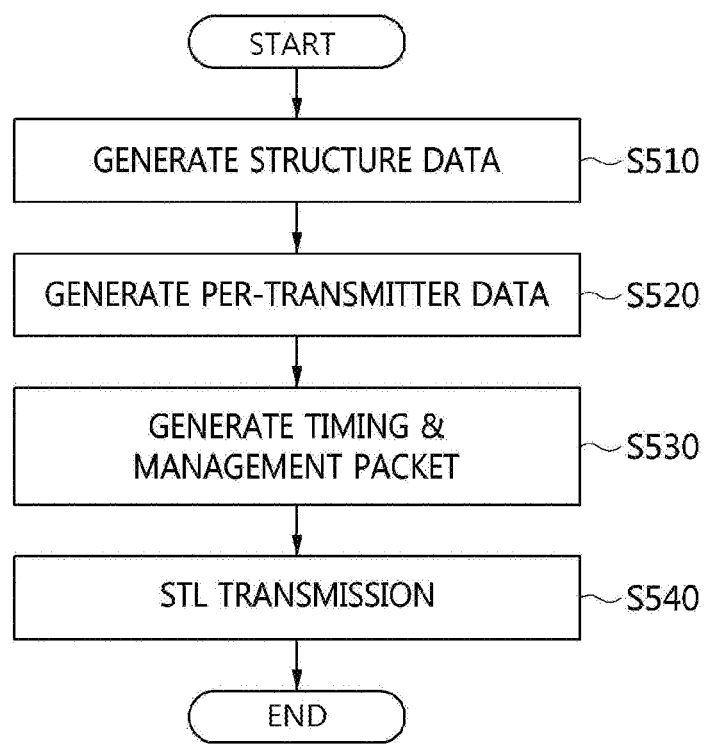
FIG. 5 is a flowchart that shows a gateway-signaling method according to an embodiment of the present invention.

FIG. 5 is a flowchart that shows a gateway-signaling method according to an embodiment of the present invention.

Referring to FIG. 5, in the gateway-signaling method according to an embodiment of the present invention, structure data, which includes first data fields for all of transmitters used for MISO, is generated at step S510.

Here, MISO may be performed through predistortion processing using Transmit Diversity Code Filter Set (TDCFS).

Here, the first data fields may include a first MISO field, which represents the number of transmitters used for MISO.

Also, in the gateway-signaling method according to an embodiment of the present invention, per-transmitter data, which includes second data fields for one transmitter of the transmitters, is generated at step S520.

Here, the second data fields may include a second MISO field, which represents the transmitter coefficient index of the one transmitter.

Here, the second MISO field may be set to a value that is equal to or less than the value of the first MISO field.

Also, in the gateway-signaling method according to an embodiment of the present invention, a timing and management packet including the structure data and the per-transmitter data is generated at step S530.

Also, in the gateway-signaling method according to an embodiment of the present invention, the timing and management packet is transmitted to the transmitters through a Studio-to-Transmitter Link (STL) at step S540.

Figure 6:
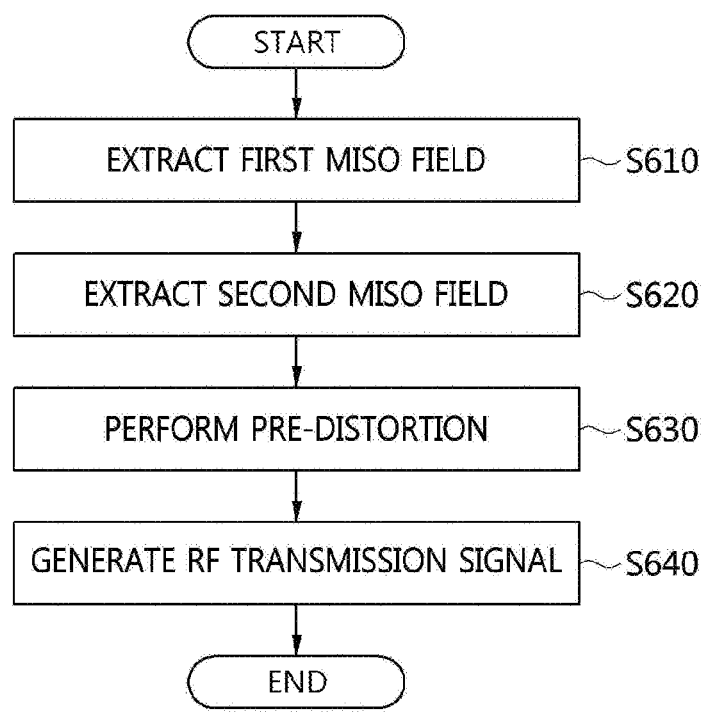
FIG. 6 is a flowchart that shows a method for transmitting a broadcast signal according to an embodiment of the present invention.

FIG. 6 is a flowchart that shows a method for transmitting a broadcast signal according to an embodiment of the present invention.

Referring to FIG. 6, in the method for transmitting a broadcast signal according to an embodiment of the present invention, structure data, which is transmitted from a broadcast gateway device and includes first data fields for all of transmitters used for MISO, is extracted at step S610.

Here, MISO may be performed using Transmit Diversity Code Filter Set (TDCFS).

Also, in the method for transmitting a broadcast signal according to an embodiment of the present invention, per-transmitter data, which is transmitted from the broadcast gateway device and includes second data fields for one transmitter of the transmitters, is extracted at step S620.

Here, the structure data and the per-transmitter data may be received using a timing and management packet, which is transmitted from the broadcast gateway device through a Studio-to-Transmitter Link (STL).

Also, in the method for transmitting a broadcast signal according to an embodiment of the present invention, predistortion for decorrelating signals corresponding to the transmitters is performed using the number of transmitters used for MISO and a transmitter coefficient index, whereby a pre-distorted signal is generated at step S630.

Here, the number of transmitters used for MISO may be indicated by a first MISO field included in the first data fields.

Here, the first MISO field is a 2-bit field, and may indicate the number of different MISO filter codes in use within an SFN.

Here, the transmitter coefficient index may be indicated by a second MISO field included in the second data fields.

Here, the second MISO field is a 2-bit field, and may indicate a specific MISO filter code assigned to the transmitter.

Here, the second MISO field may be set to a value that is equal to or less than the value of the first MISO field.

Also, in the method for transmitting a broadcast signal according to an embodiment of the present invention, an RF transmission signal is generated at step S640 using the pre-distorted signal corresponding to the transmitter coefficient index.

As described above, the gateway-signaling method and apparatus according to the present invention are not limitedly applied to the configurations and operations of the above-described embodiments, but all or some of the embodiments may be selectively combined and configured, so that the embodiments may be modified in various ways.

The invention claimed is:

1. An apparatus for transmitting a radio frequency (RF) transmission broadcast signal, the apparatus comprising:
a Multiple-Input Single-Output (MISO) predistortion unit for performing predistortion for decorrelating signals corresponding to transmitters using the number of transmitters to be used for MISO and a transmitter coefficient index, which are identified using a received timing and management packet that was transmitted through a Studio-to-Transmitter Link (STL), and thereby generating a pre-distorted signal; and
an RF signal generation unit for generating the RF transmission broadcast signal using the pre-distorted signal corresponding to the transmitter coefficient index.

2. The apparatus of claim 1, wherein the MISO is performed using Transmit Diversity Code Filter Set (TDCFS).

3. The apparatus of claim 2, further comprising:
a structure data extractor for extracting structure data, which is transmitted from a broadcast gateway device and includes first data fields for all of the transmitters; and
a per-transmitter data extractor for extracting per-transmitter data, which is transmitted from the broadcast gateway device and includes second data fields for one transmitter of the transmitters.

4. The apparatus of claim 3, wherein:
the structure data extractor extracts a first MISO field, which represents the number of transmitters used for the MISO, from among the first data fields, and
the per-transmitter data extractor extracts a second MISO field, which represents the transmitter coefficient index, from among the second data fields.

5. The apparatus of claim 4, wherein the first MISO field is a 2-bit field, and indicates the number of different MISO filter codes in use within a Single-Frequency Network (SFN).

6. The apparatus of claim 5, wherein the second MISO field is a 2-bit field, and indicates a specific MISO filter code assigned to the one transmitter.

7. The apparatus of claim 6, wherein the second MISO field is set to a value that is equal to or less than a value of the first MISO field.

8. A broadcast gateway device, comprising:
a packet generation unit for generating a timing and management packet for signaling the number of transmitters used for Multiple-Input Single-Output (MISO) and a transmitter coefficient index to one transmitter of the transmitters; and
an STL transmission unit for transmitting the timing and management packet to the transmitters through a Studio-to-Transmitter Link (STL),
wherein the MISO is performed through predistortion processing using Transmit Diversity Code Filter Set (TDCFS).

9. The broadcast gateway device of claim 8, further comprising:
a structure data generation unit for generating structure data, which includes first data fields for all of the transmitters; and
a per-transmitter data generation unit for generating per-transmitter data, which includes second data fields for the one transmitter.

10. The broadcast gateway device of claim 9, wherein:
the structure data generation unit generates a first MISO field, which represents the number of transmitters used for the MISO, as one of the first data fields, and
the per-transmitter data generation unit generates a second MISO field, which represents the transmitter coefficient index of the one transmitter, as one of the second data fields.

11. The broadcast gateway device of claim 10, wherein the timing and management packet includes the structure data and the per-transmitter data.

12. The broadcast gateway device of claim 11, wherein the first MISO field is a 2-bit field, and is set based on the number of different MISO filter codes in use within a Single-Frequency Network (SFN).

13. The broadcast gateway device of claim 12, wherein the second MISO field is a 2-bit field, and indicates a specific MISO filter code assigned to the one transmitter.

14. The broadcast gateway device of claim 13, wherein the second MISO field is set to a value that is equal to or less than a value of the first MISO field.

15. The broadcast gateway device of claim 14, wherein the MISO filter codes correspond to 64 coefficients or 256 coefficients.

16. A gateway-signaling method, comprising:
generating structure data, which includes first data fields for all of transmitters used for Multiple-Input Single-Output (MISO);
generating per-transmitter data, which includes second data fields only for one transmitter of the transmitters;
generating a timing and management packet, which includes the structure data and the per-transmitter data; and
transmitting the timing and management packet to the transmitters through a Studio-to-Transmitter,
wherein the MISO is performed through predistortion processing using Transmit Diversity Code Filter Set (TDCFS).

17. The gateway-signaling method of claim 16, wherein:
the first data fields include a first MISO field, which represents the number of transmitters used for the MISO, and
the second data fields include a second MISO field, which represents a transmitter coefficient index of the one transmitter.

18. The gateway-signaling method of claim 17, wherein the second MISO field is set to a value that is equal to or less than a value of the first MISO field.

* * * * *